(12) United States Patent
Sun

(10) Patent No.: US 7,362,244 B2
(45) Date of Patent: Apr. 22, 2008

(54) USER PROGRAMMABLE INPUT APPARATUS WITH A KEYBOARD

(75) Inventor: Ben-Chang Sun, Jhonghe (TW)

(73) Assignee: Elan Microelectronics Corporation, Hsinchu (TW)

(*) Notice: Subject to any disclaimer, the term of this patent is extended or adjusted under 35 U.S.C. 154(b) by 446 days.

(21) Appl. No.: 10/761,297

(22) Filed: Jan. 22, 2004

(65) Prior Publication Data
US 2004/0150535 A1  Aug. 5, 2004

(30) Foreign Application Priority Data
Jan. 30, 2003 (TW) .............................. 92102445 A

(51) Int. Cl.
*H03M 11/00* (2006.01)
(52) U.S. Cl. .................. 341/22; 341/23; 341/26; 345/171; 345/172; 345/173
(58) Field of Classification Search .................. 341/22, 341/23, 26, 34; 345/172, 171, 173
See application file for complete search history.

(56) References Cited

U.S. PATENT DOCUMENTS

| | | | |
|---|---|---|---|
| 4,688,020 A * | 8/1987 | Kuehneman et al. ......... 341/22 |
| 4,823,311 A * | 4/1989 | Hunter et al. ............... 708/144 |
| 4,964,075 A * | 10/1990 | Shaver et al. ................. 710/67 |
| 5,458,425 A * | 10/1995 | Torok .......................... 400/489 |
| 5,896,125 A * | 4/1999 | Niedzwiecki ............... 345/168 |
| 5,920,308 A * | 7/1999 | Kim ............................ 345/169 |
| 6,018,335 A * | 1/2000 | Onley et al. ................. 345/172 |
| 6,340,116 B1 * | 1/2002 | Cecil et al. .................. 235/492 |
| 2004/0041792 A1* | 3/2004 | Criscione .................... 345/169 |

* cited by examiner

Primary Examiner—Davetta W. Goins
Assistant Examiner—Sisay Yacob
(74) Attorney, Agent, or Firm—Rosenberg, Klein & Lee

(57) ABSTRACT

A user programmable input apparatus with a keyboard comprises several keys with one or more special keys thereof on the keyboard for input operations, a microprocessor to receive inputs from the keys when they are pressed, a nonvolatile memory programmable by operating the keys for users themselves to program or define key definitions or functions for the keyboard or to store data or microinstructions or other programs thereto, and a transmission arrangement connected to the microprocessor to output data to the computer system or other peripheral connected with the input apparatus.

20 Claims, 2 Drawing Sheets

USER PROGRAMMABLE INPUT APPARATUS WITH A KEYBOARD

FIELD OF THE INVENTION

The present invention relates generally to an input apparatus for a computer system, and more particularly, to a user programmable input apparatus with a keyboard.

BACKGROUND OF THE INVENTION

Even though computer system is developed and improved so much, it still needs an input apparatus for users to input their commands or instructions to the computer system to operate it or for the computer system to execute the desired jobs. Typically, a conventional input apparatus needs not to record the working status and important data during its operations, and there is no data lost issue after its power is turned off, so that it needs no specific memory for these purposes, and it can still work normally when the computer system is turned off and restarted. Such art is referred to the microprocessor-based keyboard/display unit for configuring a control instrument proposed by U.S. Pat. No. 4,431,988 issued to Molusis et al. as an example. However, the functions provided by conventional input apparatus are almost for human-machine interfaces, by which users trigger the signal and immediately transmit the triggered signal to the computer mainframe to accomplish the desired operations. For more detail, readers are referred to the reconfigured keyboard proposed by U.S. Pat. No. 4,688,020 issued to Kuehneman et al. as an example. To accomplish the functions of human-machine interfaces, a conventional input apparatus is required to continuously scan its receiving unit or the like to detect the trigger signal, for example, a conventional keyboard always scans its keys, reads the key values, codes it properly, and sends out the key codes at an appropriate time.

Another conventional input apparatus has a built-in card reader to read smart cards. However, such art has the functions in an additional manner instead of combinational manner, and the data accessed to the smart card have no direct relations with the input apparatus itself. In other words, such input apparatus is used as a tool to access data only, and finally the accessed data is still transmitted to the computer mainframe. It is referred to the calculator keyboard with user-defined function keys and programmable modified interactive label for certain function keys of U.S. Pat. No. 4,823,311 issued to Hunter et al. for example for such art. There are still several other arts for computer keyboards having the functions of self-defined hot keys, while they all accomplish the key definitions by software programs. Therefore, once the power is turned off, the memory content of the keyboard is lost, no matter the definitions and the software programs are stored within the keyboard or the random access memory (RAM) of the computer mainframe.

In general, conventional input apparatus is very limited in its functions, and can be connected to specific interfaces only. Furthermore, the definitions of its keys and the coding methods thereof are constantly, and special software and hardware are needed for its applications, which makes it impossible to be multi-functional.

SUMMARY OF THE INVENTION

One object of the present invention is to propose a user programmable apparatus with a keyboard, so as for users to program keys or to store data such as password and telephone number thereto by themselves.

Another object of the present invention is to propose a user programmable input apparatus with a keyboard, on which users can define hot key functions or simulate a mouse or a joystick by themselves.

In one embodiment of the present invention, a user programmable input apparatus with a keyboard comprises several keys on the keyboard for input operations, a microprocessor to receive inputs from the keys, a nonvolatile memory programmable by operating the keys, and a transmission arrangement connected to the microprocessor to output data to outside of the input apparatus.

According to the present invention, a method to operate the input apparatus comprises detecting the trigger signal of the keyboard, on which a special key is provided, storing certain data to the nonvolatile memory when the trigger signal is a programming signal, transmitting normal data corresponding to the key signal to outside of the input apparatus by the transmission arrangement when the trigger signal is a normal keying signal, and reading certain data corresponding to a programmed keying signal from the nonvolatile and/or executing the operation corresponding to the certain data when the trigger signal is matched to a programmed keying signal.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
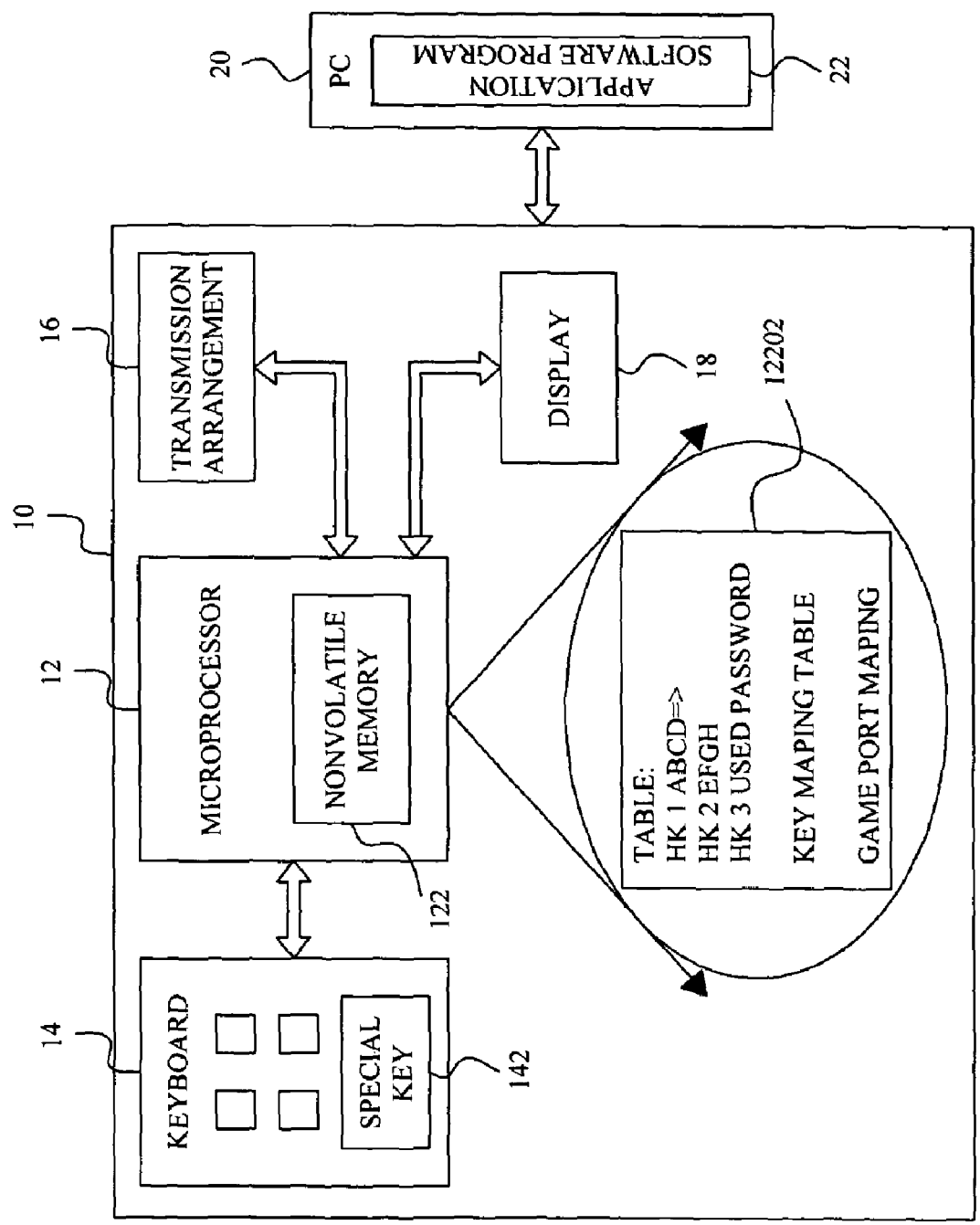
FIG. 1 shows the block diagram of one preferred embodiment according to the present invention.

FIG. 1 shows the block diagram of one embodiment according to the present invention. A user programmable input apparatus 10 comprises a microprocessor 12 and a nonvolatile memory 122, preferably integrated in a chip, and a keyboard 14 with several keys 14 thereon for input operations, among which one or special special keys 142 are provided. The microprocessor 12 receives the input from the keyboard 14 when any key thereon is pressed, and can program the nonvolatile memory 122 for users themselves by operating the keys on the keyboard 14 by which the programmed content is stored in a programming table 12202. In one embodiment, the nonvolatile memory 122 is programmed with password, hot keys or data in the programming table 12202 by operating the keyboard 14. In another embodiment, the keyboard 14 can directly change the mapping of the keys on the keyboard 14 by programming the nonvolatile memory 122. In other words, the keys of the keyboard 14 can be redefined by programming their mapping or key definitions into the nonvolatile memory 122. Moreover, the nonvolatile memory 122 can be programmed with user-defined instructions or commands thereto by operating the keyboard 14 by users themselves to for special functions. The input apparatus 10 also comprises a transmission arrangement 16 connected to the microprocessor 12 to output data outside to the computer system 20 or any other peripheral connected with the output apparatus 10. A display 18 is further provided to connect to the microprocessor 12 to display the currently typed keys, the content stored in the nonvolatile memory 122, or any information to be shown. In alternative embodiments, an application software program 22 is executed on the computer system 20 that is connected to the input apparatus 10 to communicate with the input apparatus 10. The application software program 22 can be used to program the nonvolatile memory 122, or to execute the programmed functions that have been programmed in the nonvolatile memory 122.

During the operations of the input apparatus 10, the microprocessor 12 detects the trigger signal of the keyboard 14, by which if a programming signal is detected from the special key 142, the microprocessor 12 begins to processes the programming procedure to program the nonvolatile memory 122, so as to either store new data or program into the nonvolatile memory 122 or modify the current data of the nonvolatile memory 122 including updating the programming table 12202. Alternatively, if the trigger signal from the keyboard 14 is detected to be a normal keying input, for example, as the keys of a general computer keyboard, the microprocessor 12 transmits the data corresponding to that normal key to the computer system 20 via the transmission arrangement 16. Otherwise, if the trigger signal from the keyboard 14 is matched to a programmed key that has been already programmed in the nonvolatile memory 122, then the microprocessor 12 executes the job corresponding to the programmed content in the nonvolatile memory 122. The microinstructions or system program for the microprocessor 12 to operate or to control its operations is stored in a read-only memory (ROM), as in the normal case, but not shown in FIG. 1. However, preferably, the microinstructions or system program of the microprocessor 12 can be also stored in the nonvolatile memory 122, and by which, the functions of the microprocessor 12 can be modified or updated, and new functions can be added by updating the microinstructions or system program of the microprocessor 12, i.e., by programming the nonvolatile memory 122.

The transmission arrangement 16 includes wired transmission protocol interface or wireless transmission protocol interface, for example USB or PS2 for wired transmission and IR, radio frequency (RF), IEEE 802.11 and Bluetooth for wireless transmission.

Figure 2:
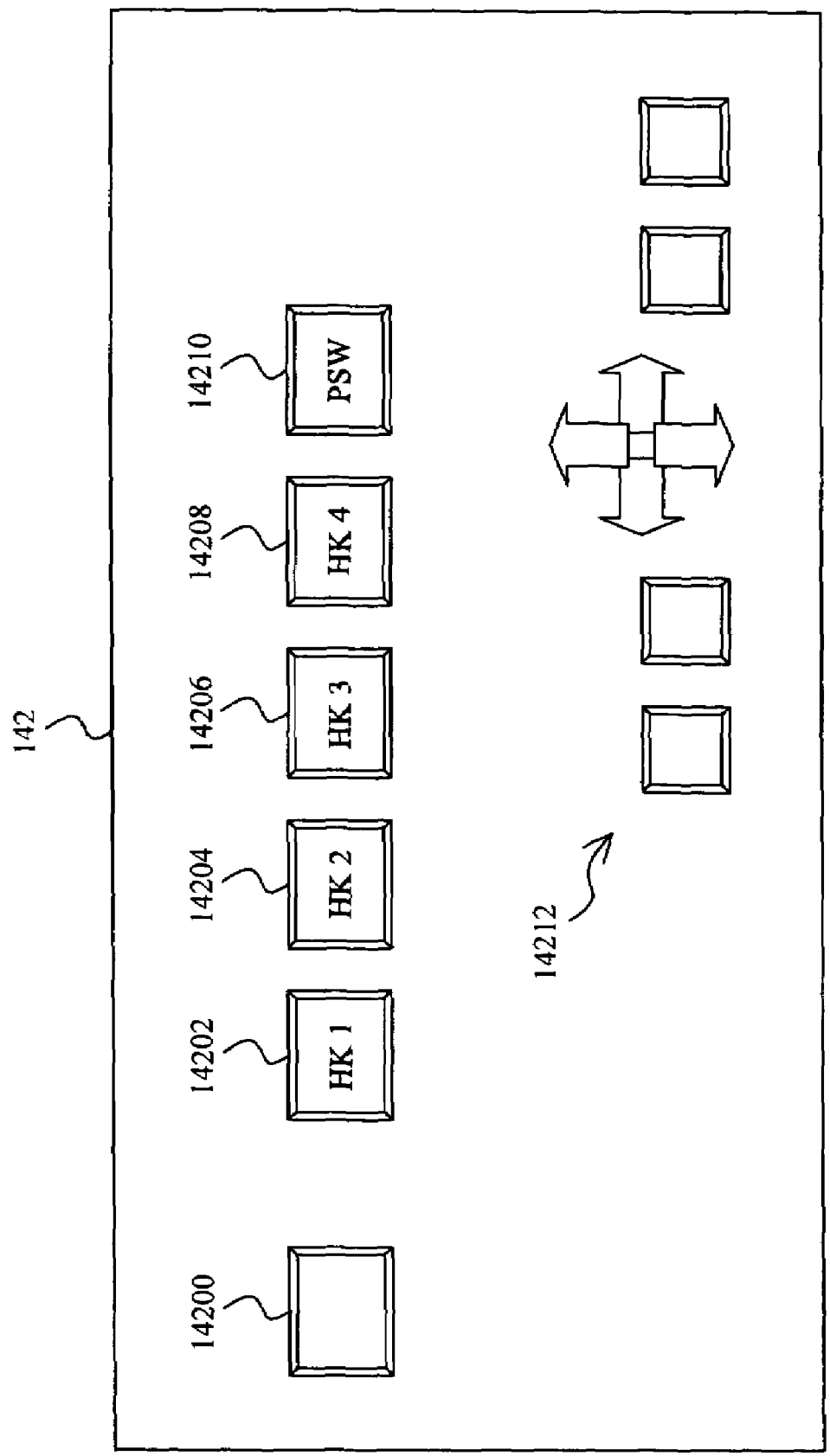
FIG. 2 shows the schematic diagram for the special keys of the apparatus shown in FIG. 1.

FIG. 2 is a schematic diagram of the special keys 142 shown in FIG. 1, which includes an input key 14200 serving as the beginning and ending trigger signal to program the nonvolatile memory 122. During the programming of the nonvolatile memory 122, hot keys 14202, 14204, 140206 and 14208 are used as the keys to be programmed, and a password key 14210 is provided for users to press before they type the password to be programmed into the nonvolatile memory 122. By programming a password in the nonvolatile memory 122, an encryption system is built-up in the input apparatus 10 for the computer system 20 or the input apparatus 10 itself to be started-up. A set of special control keys 14212 are further provided to simulate a mouse, a joystick, or a computer peripheral. The simulation performed on the special control keys 14212 can be also applied for any one of the keys on the keyboard 14. Specifically, the control key 14212 can be defined to have a report rate different from that of the simulated key, or of tuning to a matched one for simulated mouse, joystick or computer peripheral.

The operations of the input apparatus 10 comprise detecting the trigger signal of the keyboard 14. The pressing of the input key 14200 by users indicates the beginning of a programming procedure, during which one of the hot keys 14202 to 14208 is pressed to be assigned with a programmed key function, and then the key value corresponding to that programmed key function is inputted. If a password is to be programmed, the password key 14210 is pressed in advance before the normal key value is typed, so as for users to type in the desired password. When starting-up or entering the operating system, the user is inquired for a password. If the key value typed in by the user matches the password stored in the input apparatus 10, then the operating system is logged on. Otherwise, the user is requested to type in the password again. After certain times of wrong input value, the input apparatus 10 will lock itself and cannot be available for operation. The pressing of the input key 14200 after the key value is inputted indicates the end of the programming procedure, after which the programming procedure for a password, a hot key or data is completed, and the corresponding content is stored into the programming table 12202 in the nonvolatile memory 122. During the detection of the trigger signal of the keyboard 14, if the input key 14200 is not pressed, the operations of the keyboard 14 is treated as a normal keyboard, and at that time the transmission arrangement 16 is used to transmit the data corresponding to the normal keys to the computer system 20. Once a programming procedure is completed, pressing of any hot key that has been programmed, the microprocessor 12 will transmits the programmed key value corresponding to the programmed hot key via the transmission arrangement 16 to the computer system 20. The special control keys 14212 are used to simulate a mouse, a joystick, a computer peripheral or one of the keys on the keyboard 14. When the special control keys 14212 are configured to simulate a mouse or a joystick, they are switched to predetermined report rate to satisfy the criteria of a mouse or a joystick, since the frequency of the trigger signals of the keys on the keyboard 14 are different from those of mouse and joystick.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A user programmable input apparatus with a keyboard, comprising:
    a plurality of keys disposed on the keyboard for input operations;
    a microprocessor coupled to the plurality of keys for receiving an input therefrom;
    a nonvolatile memory coupled to the microprocessor and programmable by operating the plurality of keys; and
    a transmission arrangement connected to the microprocessor for outputting data external to the keyboard;
    wherein the plurality of keys includes a set of special control keys programmable to simulate a cursor control device, the set of special control keys being programmable to have a different report rate from that of the other of the plurality of keys to coincide with requirements of a cursor control device.

2. The input apparatus of claim 1, wherein the microprocessor and nonvolatile memory are integrated in a single chip.

3. The input apparatus of claim 1, wherein the nonvolatile memory is programmed with a user programmable password.

4. The input apparatus of claim 1, wherein the nonvolatile memory is programmed with a user programmable hot key.

5. The input apparatus of claim 1, wherein the nonvolatile memory is programmed with a user programmable data.

6. The input apparatus of claim 3, wherein the plurality of keys include a key to program the password.

7. The input apparatus of claim 4, wherein the plurality of keys include a key to program the hot key.

8. The input apparatus of claim 5, wherein the plurality of keys include a key to program the data.

9. The input apparatus of claim 1, wherein the plurality of keys include a key to initialize a programming procedure of the nonvolatile memory.

10. The input apparatus of claim 1, wherein the cursor control device simulated by the set of special control keys is a mouse.

11. The input apparatus of claim 1, wherein the cursor control device simulated by the set of special control keys is a joystick.

12. The input apparatus of claim 1, wherein at least one of the set of special control keys is programmable to simulate one of the other of the plurality of keys.

13. The input apparatus of claim 12, wherein the the at least one special control key has a predetermined report rate different from that of the key being simulated.

14. The input apparatus of claim 1, wherein the plurality of keys are operated to change a key mapping by programming the nonvolatile memory.

15. The input apparatus of claim 1, wherein the nonvolatile memory is programmed with a command thereto by operating the plurality of keys.

16. The input apparatus of claim 1, further comprising a display connected to the microprocessor to display a content stored in the nonvolatile memory.

17. The input apparatus of claim 1, further comprising an application software program executing external to the keyboard to communicate with the microprocessor.

18. The input apparatus of claim 17, wherein the application software program is used to program the nonvolatile memory.

19. The input apparatus of claim 17, wherein the application software program is used to perform a function programmed in the nonvolatile memory.

20. A method for operating a user programmable input apparatus with a keyboard, the keyboard having a microprocessor, a nonvolatile memory and a transmission arrangement, the keyboard having a plurality of keys and at least one special key, the method comprising the steps of:

detecting a trigger signal of a key of the keyboard;

storing a first data into the nonvolatile memory when the trigger signal is a programming signal;

transmitting a normal data corresponding to the trigger signal external to the keyboard by the transmission arrangement when the trigger signal is a normal keying signal;

reading a second data corresponding to a programmed key from the nonvolatile memory and/or executing a function corresponding to the second data when the trigger signal matches the programmed key; and programming the special key to simulate a cursor control device and changing a reporting rate of the special key to be different from that of other of the plurality of keys to coincide with requirements of the cursor control device.

* * * * *